UNITED STATES PATENT OFFICE.

HENRY WURTZ, OF NEW YORK, N. Y.

IMPROVEMENT IN COMPOSITION FROM GRAHAMITE FOR VARNISHING, COATING, AND PROTECTING THE SURFACES OF METALS, WOODS, AND FIBROUS MATERIALS.

Specification forming part of Letters Patent No. 67,697, dated August 13, 1867.

*To all whom it may concern:*

Be it known that I, HENRY WURTZ, of New York, in the county of New York, in the State of New York, have invented a new and Improved Mode of Making Compositions for Varnishes, Lacquers, Paints, and Printing-Inks, for rendering porous surfaces proof against air, as well as aqueous, acid, alkaline, alcoholic, and other liquids, and for stiffening fibrous and textile tissues; and I do hereby declare that the following is a full and exact description thereof.

The nature of my invention consists in combining together with such oils, spirits, naphthas, ethers, or other liquids as are used or susceptible of use as media or menstrua in the compounding of varnishes, paints, inks, &c., a certain mineral substance found forming a vein or dike in the rocks upon McFarland's run, in Ritchie county, West Virginia, (known by the names "Ritchie coal," "Ritchie asphaltum," "crystallized petroleum," &c., but) which I call, both here and hereinunder, by the name "grahamite."

In order to enable those skilled in the several arts to which it is applicable to practice and make use of my invention, I shall proceed to describe my methods of operation and of preparation of the various products obtainable by its means.

*Preparations for Varnishes and Lacquers.*

These are susceptible of several modifications.

1. Preparation of varnishes, &c., from raw grahamite.

This I have accomplished by four different modes.

(*a*.) The simplest of these is to dissolve the raw grahamite in such solvent liquids as furnish at once with it solutions of sufficiently strong body and consistence for this use. Among such liquids may be mentioned chloroform, bisulphide of carbon, coal-tar, benzole, the benzole furnished by distillation of grahamite itself, also oil of turpentine, (when heat under a little pressure is used with the latter,) as well as linseed and other drying oils, when boiled for a little time with the mineral.

(*b*.) A second mode is to make use of solvents which are endowed with somewhat less power of dissolving the mineral, and then to concentrate the solutions furnished by these to such a degree of consistence by evaporation as to make them suitable for varnishing purposes. Among such solvents may be mentioned oil of turpentine, petroleum-naphtha, or "gasoline," &c.

(*c*.) A third mode is to first digest the pulverized grahamite in a limited quantity of one of the more powerful solvents of this mineral, such as chloroform, bisulphide of carbon, coal-tar, benzole, or grahamite-benzole, until thoroughly penetrated and saturated thereby, and then to dissolve the pasty or semi-fluid magma thus formed in one of the cheaper solvents, the solvent which I generally prefer for this latter purpose being oil of turpentine.

(*d*.) For certain purposes a fourth mode, which is a modification of the third, may be used. This consists in dissolving the grahamite, with the assistance of heat, in fixed oils, the class of vegetable drying-oils being preferred, (though other fixed oils, rosin-oils, and even kerosene, paraffine-oils, melted paraffine, and the oils formed by distillation of grahamite itself, are more or less adapted to this purpose,) and then dissolving the pasty or tar-like magma thus obtained in other solvents, oil of turpentine being generally preferred by me for this latter purpose. For the special applications of waterproofing and enameling flexible tissues and fabrics, such as cloth, leather, paper, &c., the compositions under this head are generally preferable. Samples of these are marked A *d*.

The filtering, straining, or fining of all grahamite varnishes and lacquers may be usually effected by the well-known methods, the use of filtering arrangements heated by steam or otherwise being, of course, advisable; but when thick varnishes of high body are to be made I have used also a certain modification which I shall proceed to describe. This consists in simply diluting the varnish to about the consistence of a lacquer, with some light volatile liquid mixable and compatible therewith, for which purpose either coal-tar, benzole, or petroleum-naphtha, or grahamite-benzole, will usually answer. The filtration is then much easier and more rapid, and may be effected through a simple tuft of raw cotton in the neck of the funnel; or the mixture may be freed from sediment by simple rest and decantation. The excess of volatile liquid which was added is then distilled off, to be used again for the same purpose. I may here remark that the thinner grahamite varnishes and lacquers have (as I have discovered) the extraordinary peculiarity of drying upon polished surfaces to a beautiful brilliant iridescence. In consequence of this quality I designate such varnishes by the name of "rainbow lacquers."

2. Preparation of compound grahamite-varnishes.

I have found that by previous fusion with certain other materials grahamite is rendered rapidly and completely soluble in certain menstrua which dissolve but slowly or imperfectly the raw mineral. Materials of a tarry and balsamic character usually partake of this property. Among these I prefer, ordinarily, coal-tar, or the tar formed during the distillation of grahamite itself, or common crude turpentine. A mixture of powdered grahamite with from seventy-five to one hundred per cent. of its weight of either of these substances is readily fusible, and after fusion is very readily dissolved by oil of turpentine, and by most naphthas and benzoles, therewith forming fine lustrous varnishes, not so resistant, however, to the action of heat and chemical agents as the former class made with raw grahamite, but more resistant to cold, (without becoming brittle,) and more generally suitable for most uses. Sometimes the admixture of the ingredients before fusion is promoted by addition of naphtha, benzole, or oil of turpentine.

3. Preparations for paints and printing-inks.

These may be made either opaque or translucent.

(a.) The opaque paints and inks are made by simply grinding up the raw grahamite with ordinary linseed or other drying oil, oil of turpentine being added, if desirable. Greater opacity and blackness may, of course, be given to the ink by adding lamp-black, bone-black, or other similar pigment. Such paints and inks dry with considerable luster.

(b.) Translucent paints and inks which dry to very lustrous surfaces may be made by first mixing the pulverized grahamite with a sufficient quantity of some one of its solvents, such as oil of turpentine, to permeate it, and, after standing sufficiently long to effect a softening of the mass throughout its whole substance by the solvent, grinding it with a muller or in a paint-mill, with linseed or other drying oil. Samples of these are marked A h.

What I claim as my invention, and desire to secure by Letters Patent, is—

1. The conversion of the mineral from West Virginia (called by me "grahamite") into solutions suitable for varnishes and iridescent and other lacquers, and for coating porous or other surfaces, by either of the methods above set forth, or by any others substantially the same, or furnishing products substantially similar.

2. The use, for the purpose of varnishing, lacquering, painting, and coating surfaces generally, and for stiffening tissues, of liquids or compositions made by dissolving or mixing grahamite in any suitable liquid solvent or vehicle, substantially as set forth.

3. The use, for the purposes of printing-inks, of compositions made by dissolving or mixing grahamite in any suitable liquid solvent or vehicle, substantially as set forth.

In testimony whereof I have hereunto set my signature in the presence of two witnesses, in the city of New York, this 9th day of July, 1867.

HENRY WURTZ.

Witnesses:
H. BENKMAN,
THO. G. WEST.